Oct. 10, 1967  R. J. DOYLE  3,346,756
ELECTRODE SUPPORT FOR AN OPTICAL FIBER DISC
Filed April 13, 1965
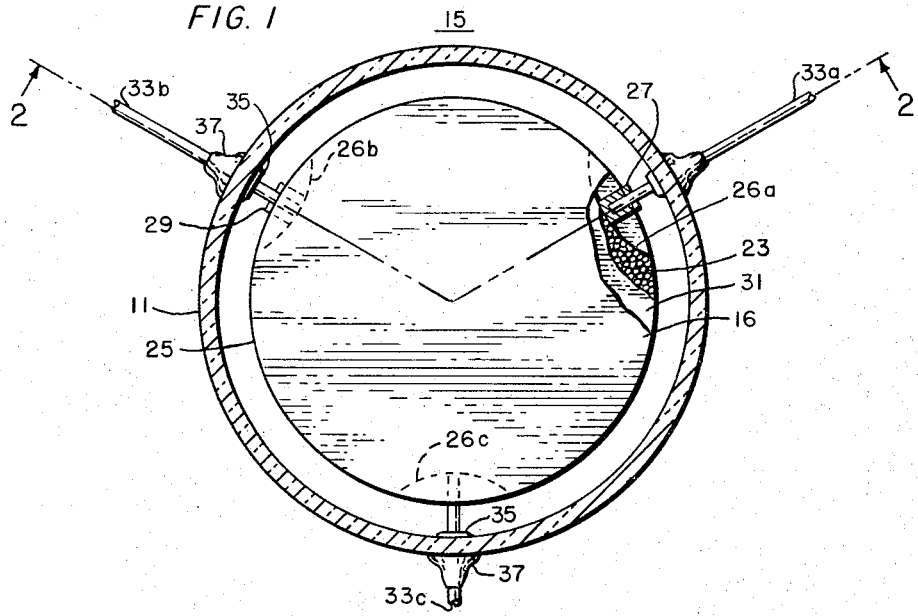
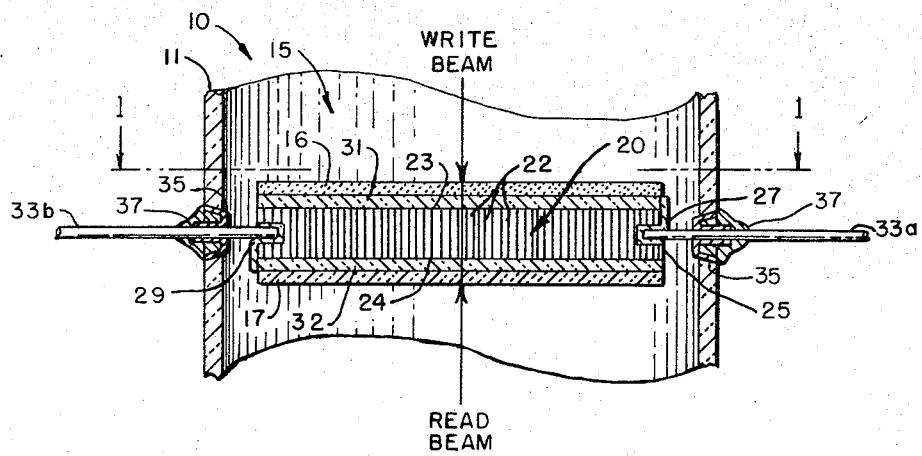
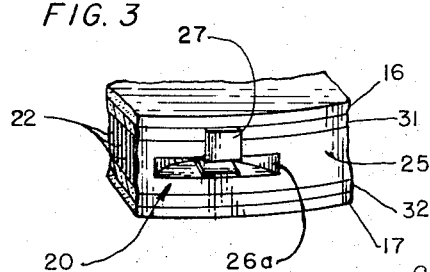
INVENTOR,
ROBERT J. DOYLE.
BY Harry M. Saragovitz
Edward J. Kelly, Herbert Berl
& Julian C. Keppler
ATTORNEYS

United States Patent Office 3,346,756
Patented Oct. 10, 1967

3,346,756
ELECTRODE SUPPORT FOR AN
OPTICAL FIBER DISC
Robert J. Doyle, Darien, Conn., assignor, by mesne assignments, to the United States of America as represented by the Secretary of the Army
Filed Apr. 13, 1965, Ser. No. 447,932
7 Claims. (Cl. 313—94)

This invention relates to an electrode assembly mounting means and, more particularly, to means for mounting a fiber optic disc carrying spaced electrodes within a tube envelope, while permitting electrical connections to be made to said electrodes externally of the tube.

In a fiber optic photon transfer scan conversion tube it is required that a fiber optic disc be mounted between the writing and reading electron guns and that electrical contact be made separately to both electrically conductive coated surfaces of the fiber optic disc. This type of tube is described in an article by R. J. Doyle entitled, "A Scan-Conversion Tube Utilizing Fiber-Optics Photon-Transfer," appearing at pages 410 to 416 of the IEEE Transactions on Electron Devices, vol. ED-10, #6, November 1963. Basically, this scan conversion tube consists of a fiber optic target assembly, which, in combination with a writing gun and a reading gun, forms a cathode ray tube and a videcon tube enclosed within a single envelope. The cathode ray portion of the scan conversion tube includes a writing gun which generates a high velocity electron beam modulated and deflected to generate a written pattern of information on a phosphor deposited over one face of the fiber optic disc. The phosphor is backed by an optically transparent, electrically conductive layer on the fiber optic disc which serves as an electrode positive relative to the cathode portion of the writing gun. The videcon portion of the scan conversion tube includes a reading gun for generating a low velocity modulated electron beam which scans a photoconductor disposed on the opposite face of the fiber optic disc. When the electron beam from the writing gun impinges upon the phosphor of the electrode assembly, photons are emitted from the phosphor and propagate through the fiber optic disc to the photoconductor. These photons increase the conductivity of the photoconductor material so that electrons previously deposited on its front surface move to the higher potential of the conductive substrate. This causes the potential of the front surface of the illuminated photoconductor areas to increase, so that, when the reading beam scans the front surface of the photoconductor, it deposits electrons on illuminated areas in proportion to the number of input photons. The deposition by the reading beam of electrons at each point across the photoconductor gives rise to an alternating current output signal which is carried externally of the tube by way of an electrically conductive layer on the electrode assembly contiguous with the photoconductor and also by way of an electrode extending through the tube envelope.

Previously, the electrode assembly for the scan conversion tube was characterized in that the fiber optic disc was clamped into a metallized ceramic holding assembly including two clamping rings, each gripping an opposite edge of the disc. The prior electrode assembly further include a spacer ring mounted between the clamping rings and bolts passing through the rings at spaced intervals about the periphery of the disc. The spacer ring was provided with spaced slots for inserting metal pins; these pins extended through the tube envelope and were sealed in said envelope. The relatively large rings of the prior mounting structure introduced considerable capacity into the tube, much of which existed between the electrodes on opposite sides of the fiber optic disc. This capacitance, in circuit with the output circuit of the reading gun, limits the frequency response of the tube. Although the undesirable capacitance introduced by the bolted rings of the prior electrode assembly may be reduced somewhat by increasing the thickness of the disc, this slight improvement would be obtained only at the expense of an increase in the length of the fiber optic rods, with a consequent reduction in light transmission and an increase in tube cost. The prior electrode assembly, involving three ceramic rings, metallization of said rings, and accompanying nuts and bolts, represents a sizable contribution to the cost of tube construction. In addition, close tolerance on the thickness and diameter of the fiber optic disc must be maintained in order to insure proper fitting of the various parts of such prior art assembly.

In accordance with the invention, a simplified, inexpensive target mount is provided in which the fiber optic disc is made slightly larger in diameter than the required conversion area in order to accommodate a plurality of spaced slots cut directly into the edge of the fiber optic disc. An electrically conductive coating is disposed within one of the slots to provide an electrically conductive path from said slot to a first electrically conductive, optically transparent layer on one face of the fiber optic disc. Another electrically conductive coating is disposed within another of the slots to provide an electrically conductive path through this slot to a second electrically conductive, optically transparent layer on the opposite face of the fiber optic disc. These first and second layers serve as electrodes for the corresponding reading and writing guns of the scan conversion tube. The photoconductor and phosphor, previously referred to, are deposited over the first and second layers, respectively. The transparent electrically conductive layers on the opposite faces of the fiber optic disc merge at the edges of the disc with the respective electrically conductive coatings which lie within the slots. A plurality of pins, shaped to fit snugly within the slots of the fiber optic disc, are inserted through eyelets sealed into the tube envelope and are welded to the eyelets. These pins, which extend through the tube envelope, can be attached to external circuit elements, if required. The pins provide both mechanical positioning and support of the fiber optic traget assembly within the scan conversion tube and also means for connecting external electrical circuitry to the phosphor and photoconductor of the target assembly located inside the tube envelope.

The novel fiber optic target mount of the invention eliminates the three ceramic rings of the prior art and the nuts and bolts required to mount the fiber optic target within said rings. The novel mounting assembly of the invention, representing an omission of the capacitance presented by the prior ring mounting structure, results in considerable reduction in capacitance, with consequent greatly improved frequency response characteristics. Furthermore, elimination of the three rings and nuts and bolts of the prior mounting structure allows for sizeable tube cost reduction and obviates requirements for close tolerance on thickness and diameter of the fiber optic disc. In this connection, reclamation of valuable fiber optic discs in certain necessary instances of improper coating, and the like, may be simplified by virtue of the reduction in thickness tolerance of the target mount according to the invention, since the disc may be lapped and polished clean without concern for mating of the slightly thinner machined fiber optic disc with mounting rings.

Other objects and uses of this invention will become obvious upon examination of the subsequent description of the invention, taken in conjunction with the drawing, wherein FIG. 1 is a plan view of an embodiment of the invention;

FIG. 2 is a cross section view taken along lines 2—2 of FIG. 1; and

FIG. 3 is a detail view of a portion of the fiber optic target assembly of FIG. 2, showing an edgewise view of a slot in the fiber optic disc.

Referring now to the drawing, a portion only of an envelope 11 for an evacuated tube 10, such as previously described, is illustrated. Since the invention resides in the means for mounting the fiber optic target assembly 15 within the tube, illustration of a complete scan conversion tube, as well as related external circuitry, is omitted for the sake of simplicity and conciseness. The target assembly 15 is more or less centrally located within tube envelope 11, with the reading gun and writing gun, not shown, being located on opposite sides of the target assembly 15. It should be understood, of course, that the read and write beams, designated in FIG. 2 by way of explanation only, are not used simultaneously. The write beam impinges upon the surface of phosphor 16, while the read beam is caused to scan the surface of photoconductor 17.

The fiber optic target assembly 15 comprises a fiber optic disc 20 made of a bundle of fiber optic rods 22 bonded together in a unitary mass. The rods 22 each terminate at end faces 23 and 24 of the disc 20. The method of fabrication of such bundles is well known in the art, and the number of optical rods will depend upon the degree of image resolution desired. The edge 25 of fiber optic disc 20 contains a plurality of slots 26a, 26b, and 26c. The slots 26 may be cut into the edge 25 of the disc 20, as by exposing various spaced portions of the edge of the disc to a rotating saw blade. Many variations of slot configuration are within the scope of this invention, however.

An electrically conductive coating 27, for example, aluminum or silver paint, is applied to at least a portion of the walls of slot 26a and includes a portion extending along the edge 25 of disc 20 to the face 23. Similarly, an electrically conductive coating 29 is applied to at least a portion of the boundary of slot 26b and is carried along the edge 25 of disc 20 until it reaches the face 24 of disc 20. The faces 23 and 24 of disc 20 are coated with respective optically transparent, electrically conductive layers 31 and 32, which, for example, may be tin oxide or gold. Care must be taken that the conductive layers 31 and 32 make physical and electrical contact with the conductive coatings 27 and 29 that run into slots 26a and 26b, all respectively. Layer 32 serves as the output electrode for the videcon or read portion of the scan conversion tube, while layer 31 serves as a positive electrode for the write or cathode ray tube portion of the scan conversion tube. Finally, the phosphor 16 is deposited on electrode layer 31 and the photoconductor 17 is placed in contact with electrode layer 32.

A plurality of pins 33a, 33b, and 33c are inserted through the eyelets 35 sealed into tube envelope 11 and into the corresponding slots 26a, 26b and 26c. The pins are joined securely to the eyelets 35, as by heliarc welds 37. Pins 33 are shaped to fit snugly in the respective slots 26; also it is essential that the pins 33a and 33b, that is, the electrode pins, make physical contact with some portion of the conductive coatings 27 and 29 in slots 26a and 26b, respectively. If the slots 26 are of the type resulting from a sawcut, as shown in FIGS. 1 and 3, considerable latitude in the orientation of fiber optic disc 20 can be tolerated without fear of misalignment of the various slots and pins. With the configuration shown in FIGS. 1 and 3, there would still be adequate physical contact between the pins and walls of the corresponding slot to provide adequate mechanical support for the disc.

The invention is not necessarily limited to the details actually illustrated an described. For example, in the device illustrated in the drawing, three mounting pins are shown, each spaced 120° about the periphery of the tube. In this instance, one of the three pins, namely, pin 33c, would not be connected electrically to external circuitry. For this reason, conductive coatings could be omitted from the corresponding slot 26c, if desired. A minimum of two mounting pins 33 will suffice electrically; however, mechanical support considerations normally dictate the use of at least three of said mounting pins.

What is claimed is:

1. In combination, a fiber optic disc having spaced slots formed in the periphery thereof:

first electrode means disposed on one face of said disc, second electrode means disposed on the opposite face of said disc, a first one of said slots having an electrically conductive coating connected to said first electrode means, a second one of said slots having an electrically conductive coating connected to said second electrode means, and a plurality of mounting pins each protruding into a corresponding slot and electrically and mechanically engaging at least a portion of the boundary of that slot, whereby said disc is directly and solely supported by said pins.

2. In combination, a fiber optic disc having spaced slots formed in the periphery thereof:

a first electrode disposed on one face of said disc, a second electrode disposed on the opposite face of said disc, a portion of the boundary of a first one of said slots having an electrically conductive coating therein connected only to said first electrode, a portion of the boundary of a second one of said slots having an electrically conductive coating thereon connected only to said second electrode, and a plurality of mounting pins each protruding into a corresponding slot and mechanically engaging at least a portion of the boundary of that slot, first and second ones of said pins being electrically conductive and in electrical and mechanical contact with the coatings in respective first and second slots, whereby said disc is directly and solely supported by said pins.

3. In an electron tube having an envelope, the combination comprising:

a bundle of fiber optic rods formed into a unitary disc with the rods terminating at opposite faces of said disc, at least two spaced slots formed in the edge of said disc, a pair of electrically conductive optically transparent layers disposed on opposite faces of said disc, a first electrically conductive coating disposed on the walls of a first slot providing a conductive path from said first slot to one of said layers, a second electrically conductive coating on the walls of a second slot providing a conductive path from said second slot to the other of said layers, and electrically conductive pins extending through said envelope and fixedly sealed thereto, each of said pins fitting into a corresponding one of said slots and firmly engaging at least a portion of the walls of that slot, the pins in each of said two slots electrically and mechanically contacting the respective coating on that slot, whereby said disc is directly and solely supported by said pins.

4. In combination, a bundle of fiber optic rods formed into an integral disc with the rods terminating at opposite faces of said disc, at least two spaced slots formed in the edge of said disc, a pair of electrically conductive optically transparent layers disposed on opposite faces of said disc, a first electrically conductive coating disposed on the walls of a first slot providing a conductive path from said first slot to one of said layers, a second electrically conductive coating disposed on the walls of a second slot providing a conductive path from said second slot to the other of said layers, and electrically conductive pins each fitting into a corresponding one of said slots and firmly engaging at least a portion of the walls of that slot, said pins in each of said slots electrically and mechanically engaging the respective coating in that slot, whereby said disc is directly and solely supported by said pins.

5. In combination, a bundle of fiber optic rods formed into an integral disc with the rods terminating at opposite faces of said disc, at least two spaced slots formed in the edge of said disc, a pair of electrically conductive optically transparent layers disposed on opposite faces of said disc, a first electrically conductive coating disposed on the walls of a first slot and on a first portion of the edge of said disc providing a conductive path from said first slot to one of said layers, a second electrically conductive coating disposed on the walls of a second slot and on a second portion of the edge of said disc providing a conductive path from said second slot to the other of said layers, and electrically conductive pins each fitting into a corresponding one of said slots and firmly engaging at least a portion of the walls of that slot, the pins in each of said two slots electrically and mechanically contacting the coating associated with that slot, whereby said disc is directly and solely supported by said pins.

6. In an electron tube having an envelope, the combination comprising:

a discoidal bundle of fiber optic rods terminating in first and second opposed face portions, a first optically transparent electrically conductive layer disposed on said first face portion, a second optically transparent electrically conductive layer disposed on said second face portion, a plurality of spaced slots formed in the edge of said bundle, a first electrically conductive coating disposed in one of said slots and connected to said first layer, a second electrically conductive coating disposed in another of said slots and connected to said layer, and a plurality of electrically conductive mounting pins each extending through said envelope into a corresponding one of said slots and mechanically engaging the boundary of that slot, one of said pins electrically and mechanically contacting said first coating, and another of said pins electrically and mechanically contacting said second coating, whereby said discoidal bundle is directly and solely supported by said pins.

7. In an electron tube having an envelope, the combination comprising:

a discoidal bundle of fiber optic rods terminating in first and second opposed face portions, a first optically transparent electrically conductive layer disposed on said first face portion, a second optically transparent electrically conductive layer disposed on said second face portion, a plurality of spaced slots formed in the edge of said bundle, a first electrically conductive coating disposed in one of said slots and connected to said first layer, a second electrically conductive coating disposed in another of said slots and connected to said second layer, said envelope including a number of apertures each containing an eyelet, a plurality of electrically conductive mounting pins each extending through a corresponding eyelet in said envelope into a corresponding one of said slots and mechanically engaging the boundary of that slot, one of said pins electrically and mechanically contacting said first coating, another of said pins electrically and mechanically contacting said second coating, and means for fixedly securing said pins to said eyelets;

whereby said discoidal bundle is directly and solely supported by said pins.

References Cited
UNITED STATES PATENTS

| | | | |
|---|---|---|---|
| 1,935,649 | 11/1933 | McCreary | 313—64 |
| 2,885,560 | 5/1959 | Destriau | 313—92 X |
| 2,968,741 | 1/1961 | Frazier | 313—92 X |
| 3,244,921 | 4/1966 | Behun | 313—89 X |
| 3,254,250 | 5/1966 | Doyle | 313—254 X |

JOHN W. HUCKERT, *Primary Examiner.*

A. J. JAMES, *Examiner.*